UNITED STATES PATENT OFFICE.

JOHN JOHNSON, OF SACO, MAINE.

IMPROVEMENT IN THE MANUFACTURE OF SPIRITS OF TURPENTINE.

Specification forming part of Letters Patent No. 50,132, dated September 26, 1865.

*To all whom it may concern:*

Be it known that I, JOHN JOHNSON, of Saco, in the county of York, State of Maine, have invented a new and Improved System for the Production of Terebinthinate Extractive Matters; and I do hereby declare that the following is a full and exact description thereof.

The nature of my invention consists in extracting the terebinthinate and other oleo-resinous compounds by hot water, steam, oils, and other liquids, and also by heated air, gases, and vapors.

To enable others to make and use my invention, I proceed to detail, first referring to Patent 40,737, granted to Seth L. Cole, of Vermont. This patentee takes resinous wood and suitably prepares it as to size, and places the same in an iron basket, and when filled places the basket with its contents into a retort, this retort being properly set in a furnace, and having connections to a condenser and to a tar-well. The retort being properly heated from the outside, distillation soon commences from the wood, and there comes over gas, water, steam, spirits, oil, tar, and other hydrocarbon compounds, pyroligneous acid, &c. The greater portion of the condensable gases are condensed to liquids and semi-liquids, and the permanently gaseous products are utilized or are allowed to go to waste, and the tarry products which do not volatilize pass off by the tar-well.

Superheated steam has been used in Europe for the production of pyroligneous acid and tar products, and hot water and steam are used in the production of the essential oils; but I proceed to show that although steam, hot water, and hot liquids have been used in producing valuable and well-known materials, nevertheless I obtain terebinthinate extractive matters in a manner unknown and unpracticed till my application thereto by the use and application of hot water, hot liquids, steam, and heated air. The nature of this distillation of Cole's, as also that in Europe, by the use of superheated steam, is classed as "destructive distillation," and that referred to above, when water and steam are used, is for the production of the essential oils from seeds, herbs, and the like in pharmaceutical preparations and uses.

Destructive distillation produces, by necessity, a great variety of hydrocarbon compounds, much of the resinous material of the wood being converted to oil and a large number of chemical compounds combined therewith, and with free carbon are brought over with the more volatile products and condensed together. The true spirits of turpentine is found very difficult of attainment, even by repeated distillation or by fractional distillation. The product, even prepared in the most careful manner, has an empyreumatic odor, rendering it of less commercial value than spirits of turpentine obtained from turpentine by exudation and distillation by the aid of water, as is commonly practiced in the Southern States. Some of our leading chemists assert that the liquid known as "Burlington spirits," produced by destructive distillation, is not in any sense camphene or true spirits of turpentine.

In my practice for the production of resin or turpentine, I take any suitable boiler properly set, into which I place the wood or lumber. I then nearly fill the boiler with water and boil it. The lumber being entirely under water, the boiling water soon eliminates the terebinthinate, and this floats by circulation of the water and continued boiling, and may be removed immediately on rising to the surface. When so removed it will be found to contain a large percentage of the spirits of turpentine on subsequent treatment for the procurement of this product.

As water cannot be heated to a higher temperature than 212° Fahrenheit in an open vessel, and as it is desirable to have a superior temperature for the more perfectly eliminating the terebinthinate, I find it desirable to incorporate any suitable salt, by the addition of which the boiling temperature of the water may be increased to the desirable degree, thereby eliminating a larger percentage of extractive matter than could be done at the lower temperature.

To guard against even the loss of any small percentage of the more volatile products arising from the surface of the boiler, I find it desirable to have a movable hood properly connected with a condenser, and an exhausting-pump, by the aid of which I draw warm air over the surface of the boiling caldron, and, there commingling it with the steam, take both it and the steam through a condenser, thereby gathering the spirits of turpentine thus brought over, which would otherwise be dissipated and lost.

I find by practical working that when resinous wood is sealed up in tubes with water or liquid solvents, and these tubes and contents submitted to a high degree of temperature, but little of the contained products can be eliminated, the pressure thereby generated preventing in a great degree the heat from eliminating the contained material.

I take properly-prepared wood as to size and place it in a suitable vessel, still, boiler, retort, or other receptacle, and then add thereto any solvent of terebinth, and as heat materially aids solvents in their extractive power, and as circulation is important, by any suitable means I increase the temperature. A very good and safe plan when any inflammable volatile products are used as solvents is to combine with the wood receptacle a "Perkins hot-water circulator," or one of a similar principle, filled with mercury in lieu of water; or steam may be made to pass through a steam-coil. In either case the fire which serves to increase the temperature of the solvent in the boiler or still may be located at any convenient and safe distance, and the heat thus generated will be conveyed to the retort, and after being continued for the required time to abstract the terebinthinate, the heat may be sufficiently increased to distill off the more volatile liquids and be condensed by passing through a proper condenser till there be left a semi-fluid resinous compound, which may be removed from the still by pipe and stop-cock. The remaining ligneous matter may now be treated in water, steam, or heated air, to further eliminate such products as the solvents used have not removed, taking care not to overheat the wood. If the wood should be overheated, an empyreumatic compound is produced, which renders the products inferior and of much less commercial value; or, after treating the prepared wood with any suitable solvent and thereby abstracting the more valuable products, the wood may then be treated to any of the common and well-known destructive-distillation processes for obtaining the usual products of such distillation.

To more effectually bring over the products by distillation in the case of using heated air or gases, I prefer to exhaust the retort or boiler by using an exhausting-engine or pump attached to a proper vessel connected to the exhaust-pump and condenser, the end of the condenser-pipe being sufficiently beneath a liquid seal to obtain the requisite pressure in the boiler for the best practical distillation.

To further extend the usefulness of my discovery, I place in a suitable boiler made sufficiently strong for any required pressure, and arrange therein bars and braces or frames for holding any ligneous matter containing products to be eliminated, and when the wood is placed therein and this apparatus be properly closed, a small quantity of water is added, a fire is lighted, and steam generated of the required tension and permeates the wood most thoroughly, thereby eliminating the extractive matter; and to further separate this eliminated product, I take over from the boiler, by a suitable pipe to a condenser, at the same time the terebinthinate extract is being eliminated in the boiler, the steam; this, passing over to the condenser, carries with it the spirits, and is here gathered for rectification or for commercial purposes.

Sometimes it is desirable after steaming the wood thoroughly to entirely submerge the whole of the wood in hot water and to continue the boiling or steaming temperature so long as any commercial valuable products come off. Although the combined products from the wood are generally of a greater specific gravity than water, a greater portion floats on the surface of water during ebullition.

A complete apparatus consists of two boilers placed side by side with suitable fire-places for properly heating them. The two boilers are properly connected together by pipe and stop-cock, the one being charged and supplied with water for steam. The wood having been well steamed, the water from the adjoining boiler is forced into the filled one and the boiling and distilling continued therein so long as any products come over. This will depend much on the size of the wood and the nature of it. While the boiling, &c., is continued in this boiler, the adjoining boiler being shut off in connection therefrom, and being nearly quite free from water, it may be charged with wood and otherwise got ready for working. By this means I am enabled to alternate and work first one boiler and then the other, as circumstances require their use. In this case there is but little loss of temperature, and the same water is used over and over again, merely having to supply that driven off to obtain the spirits and resin, after the spirit is driven off and the resinous exudation pretty effectually eliminated. In order to remove the resin I provide suitable openings by valve or stop-cock, and at the proper time float it off or drive it out into the tank provided for it. This being removed from off the surface, and the water in this boiler being mostly forced into the adjoining one and the stop-cock shut, a little steam is again generated for the purpose of causing any adhering resinous body to the wood before removal to be precipitated therefrom, and finally discharged from the lower orifice of the boiler.

As heat in any form, whether conveyed by water, steam, or gases, readily eliminates or exudes the terebinthinate, I pass hot air or gases around, through, or among suitably-stacked wood in a vessel, boiler, or building properly constructed, and by causing the air, gases, &c., to pass through a cooled chamber or condenser the volatile portions are condensed and gathered, and the more solid exudations are run off at a suitable outlet into proper vessels for their reception, care being taken not to elevate the temparature so high as to char the wood.

To thoroughly eliminate the terebinthinate or other extractive matters with the view to render the ligneous portion more valuable, at the same time render all the other products commercial, and not to convert the wood to charcoal, I stack up many cords of wood or hundreds of (cords of wood) cubic feet of lumber into a suitably-prepared building for its reception, and place at one side or at any suitable place a furnace with a proper chimney-pipe about the building, for the purpose of economy. On this furnace I place an open boiler, from which steam is generated and finds its way about, among, and through the wood and lumber; or a "Perkins circulator" may be substituted for the open boiler and furnace, with the view to generate steam therefrom and otherwise supply the requisite temperature. The floor of this building is covered with water, and as the resin and turpentine exudes from the wood the former falls therefrom to the water, and what spirit has been eliminated is condensed thereon, and finally the resin and spirits are gathered for distillation. It is found that by continuing the steam-heat for about twenty-four hours much more of the terebinthinate originally contained in the wood can thus be removed than by ebullition in water; and by this continued steaming the wood or lumber is far advanced in seasoning, and is improved in value for many uses. By this method, although the time for removing the extractive matters is very much prolonged over that of ebullition or high steam, it yet possesses advantages in being enabled to remove from boards, planks, and joists in their merchantable lengths, and from vastly larger quantities under one operation than would be convenient or practicable to do in boilers, as herein set forth, or by any plan that I am acquainted with, the terebinthinates.

Hot air and steam are both extensively employed in seasoning lumber up to the time of my invention. However, I am not aware that in seasoning lumber any attention has been given to the gathering up for treatment and use the terebinthinates thus eliminated.

Wood being compressible, I find, after being steamed and boiled, it may then be advantageously passed through suitable rollers for the further eliminating the oleo-resinous bodies contained therein, some of which by heat cannot be removed short of destructive distillation. If, on the other hand, wood which has been thoroughly steamed be subjected to a vacuum under a menstruum, it will interpenetrate the pores of the wood, and on again raising the temperature more contained materials will be released than if not so treated.

I do not claim the use of steam, air, water, or solvents for the production of spirits or oil or turpentine, resin, oleo-resin, or terebinthinate, all of these agents having been used previous to my discovery. Steam and air in destructive distillation, and water when distilling turpentine for the production of spirits, &c.

What I do claim as my discovery is—

1. The employment and use of water, steam, air or gases, and solvents when circulating around, among, and through wood, timber, or lumber in proper receptacles at a temperature and sufficiently low to secure the extractive terebinthinates and resins free from empyreumatic odors, substantially as specified.

2. The mode of procuring resin and spirits of turpentine by heating the lumber or wood placed over a stratum or sheet of water, which condenses the volatile products of the wood therein and fixes the resin when the same is used in combination with the seasoning of lumber, substantially as specified.

3. The mode of using two boilers successively for economizing the heat and avoiding waste of terebinthinate products, substantially as specified.

4. The mode of increasing the temperature of the liquid for extracting exudable and volatile products from wood by the use of any suitable soluble salt, substantially as specified.

5. Passing heated air over the surface of a liquid to aid in taking up the volatile products for condensation previous to their entry into the condenser, substantially as specified.

6. Compressing wood after steaming to eliminate oleo-resins, substantially as specified.

JOHN JOHNSON.

Witnesses:
   Jos. S. Milliken,
   James M. Deering.